(12) United States Patent
Romm

(10) Patent No.: US 8,611,423 B2
(45) Date of Patent: Dec. 17, 2013

(54) DETERMINATION OF OPTIMAL FRAME TYPES IN VIDEO ENCODING

(75) Inventor: Ilya Romm, Bat Yam (IL)

(73) Assignee: CSR Technology Inc., Sunnyvale, CA (US)

( * ) Notice: Subject to any disclaimer, the term of this patent is extended or adjusted under 35 U.S.C. 154(b) by 1312 days.

(21) Appl. No.: 12/029,201

(22) Filed: Feb. 11, 2008

(65) Prior Publication Data
US 2009/0202163 A1    Aug. 13, 2009

(51) Int. Cl.
H04N 7/12       (2006.01)
H04N 11/02      (2006.01)
H04N 11/04      (2006.01)

(52) U.S. Cl.
USPC ......... 375/240.16; 375/240.15; 375/E07.124; 382/236; 382/238

(58) Field of Classification Search
USPC ......... 382/248, 250, 268, 264, 166, 234, 236, 382/240; 375/240.26, 240.16, 240.29, 375/240.02, 240.27, 240.28, 240.25, 375/240.12; 348/413, 416, 415, 411, 410, 348/409, 441, 437, 571, 420, 236, 234, 232
See application file for complete search history.

(56) References Cited

U.S. PATENT DOCUMENTS

| | | | |
|---|---|---|---|
| 6,385,244 B1 | 5/2002 | Morad et al. | |
| 6,697,430 B1 * | 2/2004 | Yasunari et al. | 375/240.13 |
| 6,757,329 B2 | 6/2004 | Morad et al. | |
| 6,798,837 B1 * | 9/2004 | Uenoyama et al. | 375/240.16 |
| 6,847,686 B2 | 1/2005 | Morad et al. | |
| 6,973,126 B1 * | 12/2005 | Yoneyama et al. | 375/240 |
| 7,388,913 B1 * | 6/2008 | Christopoulos et al. | 375/240.16 |
| 7,596,179 B2 * | 9/2009 | Shen et al. | 375/240.16 |
| 2002/0196854 A1 * | 12/2002 | Kim | 375/240.17 |
| 2003/0086495 A1 | 5/2003 | Cheung | |
| 2003/0161401 A1 * | 8/2003 | Shen et al. | 375/240.16 |
| 2003/0189980 A1 * | 10/2003 | Dvir et al. | 375/240.16 |
| 2004/0101058 A1 * | 5/2004 | Sasai et al. | 375/240.26 |
| 2006/0066728 A1 * | 3/2006 | Batur | 348/208.99 |
| 2007/0025447 A1 * | 2/2007 | Kojokaro et al. | 375/240.24 |
| 2007/0071104 A1 * | 3/2007 | Kondo | 375/240.21 |

OTHER PUBLICATIONS

Toan Nguyen Dinh et al., "Reducing Spatial Resolution for MPGE-4 / H.264 Transcoding with Efficient Motion Reusing", Seventh International Conference on Computer and Information Technology, 2007 IEEE pp. 577-580.*

Lee et al., "Motion estimation algorithm using low resolution quantisation", Electronics Letters Mar. 28, 1996 vol. 32 No. 7, pp. 647-648.*

Bo Shen et al., "Adaptive Motion-Vector Resampling for Compressed Video Downscaling", IEEE Transactions on Circuits and Systems for Video Technology, vol. 9, No. 6, Sep. 1999, pp. 929-936.*

* cited by examiner

*Primary Examiner* — Mekonen Bekele
(74) *Attorney, Agent, or Firm* — Lando & Anastasi, LLP

(57) ABSTRACT

The invention facilitates the use of low resolution estimation to identify an optimal sequence of frame types for encoding a stream of video data. In one embodiment a series of video frames are downscaled and divided into superblocks. Low resolution motion estimation metrics are calculated for the superblocks and compared to corresponding superblocks of a previous frame. A series of video frame types is selected based on the comparison metrics and used to encode the video frames.

23 Claims, 4 Drawing Sheets

DETERMINATION OF OPTIMAL FRAME TYPES IN VIDEO ENCODING

FIELD OF THE INVENTION

The present invention relates generally to the field of encoding video data, and more particularly to using low resolution estimation to identify optimal frame types in a video sequence.

BACKGROUND OF THE INVENTION

The Motion Picture Experts Group ("MPEG") has defined a standard bitstream syntax (the MPEG standard) for the coded representation of video. The MPEG standard includes three types of video frames that are used during the encoding of MPEG video sequences: intra frames ("I-frames"), predicted frames ("P-frames") and bi-directional frames ("B-frames").

A video sequence generally begins with an I-frame, followed by a sequence of B- and P-frames. In conventional encoding processes, this sequence of video frames is fixed for a particular video stream (e.g., IBBPBBPBBP . . . etc.), followed by an identical sequence, regardless of any changes to the actual video scene. Typically, the sequence is optimized for video sequences where the frame-to-frame scene changes are not too rapid. If, however, the frame-to-frame motion is rapid and the time between P-frames is too long (e.g., the distance from a previous P- or I-frame is too large), the quality of the resulting encoded video may suffer.

It is generally understood that using different sequences of frame types for different types of motion is advantageous. In order to change a sequence of frame types, however, it is necessary to provide an effective scheme of motion estimation. Although this assessment can be achieved by using a macroblock level motion estimation (ME) process, normally used in MPEG encoders, such a solution is not cost effective.

It is therefore desirable to identify techniques and systems to determine the appropriate sequence of video frame types given a series of video frames having certain qualities. The present invention does so by using a low resolution motion estimation ("LRME") and the motion estimation process takes place on these low-resolution frames.

SUMMARY OF THE INVENTION

The present invention provides accurate motion estimation for the purpose of determining the desired frame sequence with a simpler and lower cost implementation than current solutions. The present invention allows for an effective way to determine the sequence of frame types best fitted for the video stream at hand, thus providing an encoding of the video sequence that results in a higher quality playback of the video.

By using LRME, the present invention provides for a better quality image in a wide range of video scenes, from practically motionless images or sequences with little to no change between frames, to very fast motion where there are significant changes between frames. Accordingly, the invention allows for different types of video streams to have an appropriate sequence of B and P type frames subsequent to an I type frame.

In a first aspect, a method of encoding video frames includes downscaling the video frames, dividing each of the downscaled video frames into superblocks, and performing a low resolution motion estimation on each of the superblocks for each frame. The results of the low resolution motion estimation for each superblock produce a series of comparison metrics for the video frames. A series of video frame types is then selected based on the series of comparison metrics and the video frames are encoded accordingly.

In some embodiments, the method may include encoding the plurality of video frames using MPEG2 video encoding. The comparison metrics may be, for example, an average of the sum of the absolute differences between pixels of this superblock of a first frame and pixels of the superblock of a preceding frame with best motion vector is less than a predefined threshold. The comparison metrics may also include the number of superblocks for which the difference between motion vectors in a first frame and a preceding frame of a plurality of video frames is above a predetermined threshold. In some embodiments, the selection of the series of video frame types may be based on a value computed from a given frame's superblocks, and where that value falls when compared to a predefined threshold or thresholds. In these embodiments, the predefined thresholds may be based on a comparison of the video frames to a display of a series of standard video frames of known quality. The comparison may also include two thresholds such that the comparison between the series of comparison metrics and the thresholds results in a classification of the video frames into one of three comparison result classifications. These three comparison result classifications may comprise a good comparison classification for which the comparison metric, for example, sum of absolute differences (SAD), is less than each of the two thresholds, an intermediate comparison classification for which the comparison metric is between the two thresholds, and a poor classification for which the comparison metric is bigger than each of the two thresholds. The video frame types may be reference frames (which may be intra frames and predicted frames) and bi-directional frames. In some instances, the video frames may include N frames, where N is a positive integer greater than 1 (e.g., 4), and in cases where a first frame is classified as a reference frame, the comparison between each of the second through (N−1)st frames to the first frame results in a classification of good, and the comparison between the Nth frame to the first frame results in a classification of poor or intermediate, classifying each of the second through (N−1)st frames as bi-directional frames and the Nth frame as a reference frame.

In another aspect, a device for encoding video frames includes a module for downscaling the video frames and dividing each of the downscaled video frames into superblocks. A processor performs a low-resolution motion estimation of each of the superblocks of each frame relative to a number of downscaled previous frames, resulting in a series of comparison metrics. The device also includes a selector for selecting a series of video frame types based on the comparison metrics and an encoder for encoding the video frames based on the selected series of video frame types.

In some embodiments, the selector selects a series of video frame types based on a comparison between the series of comparison metrics from one of the video frames to a previous video frame and predefined thresholds. The predefined thresholds may, for example, include two thresholds such that a comparison between the series of comparison metrics and the thresholds results in a classification of the video frames into one of three comparison results classifications. The three comparison result classifications may, for example, include a good classification (for which the comparison metric is greater than each of the two thresholds), an intermediate classification (for which the comparison metric is between the two thresholds), and a poor classification (for which the comparison metric is less than each of the two thresholds). The video frame types may be reference frames, which may be intra-frames or predicted frames, and bi-directional frames. In some embodiments, a series of video frames may include N frames, where N is a positive integer greater than 1 (e.g., 4). In some implementations, a first frame may be classified as a reference frame and compared to each of the second through N frames. In these implementations, if the comparison between the first frame and a frame i, where $1 \leq i \leq N$, is classified as "good," and the comparison between the first frame and a frame i+1 is classified as "bad," then frame i will be designated as a reference frame, and a new sequence of N frames begins at frame i+1.

In another aspect, an article of manufacture having a computer-readable medium with the computer-readable instructions embodied thereon for encoding video frames is described. The article comprises computer-readable instructions for downscaling the video frames, dividing each of the downscaled video frames into superblocks, and performing a low-resolution motion estimation on each of the superblocks for each frames. The article also includes instructions for comparing the results of the low resolution motion estimation for each superblock to a corresponding superblock in a previous frame, resulting in a series of comparison metrics for the plurality of video frames. Moreover, the article includes instructions for selecting a series of video frame types based on the series of comparison metrics and for encoding the plurality of video frames accordingly.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

DETAILED DESCRIPTION

Figure 1:
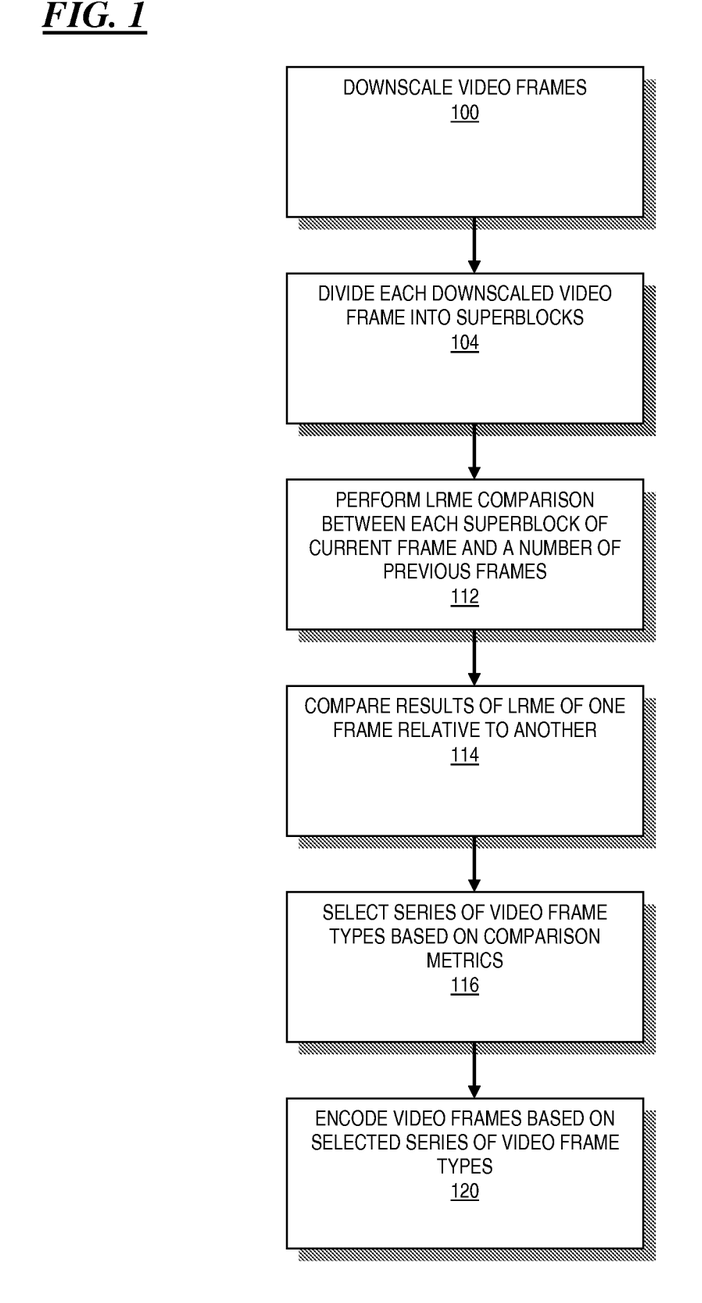
FIG. 1 is a flow chart depicting steps for encoding a plurality of video frames in accordance with various embodiments of the invention.

FIG. 1 illustrates, at a summary level, steps for encoding video frames in accordance with various embodiments of the invention. First, the video frames are downscaled (STEP 100) and divided into superblocks (STEP 104). For each superblock, an LRME process is performed, comparing the current frame and a number of previous frames until a reference frame (i.e., an I or P frame) is encountered. The comparisons may, in some embodiments, be performed in display order (STEP 112). The LRME results of one frame relative to another may be assessed relative to different metrics (STEP 116). The results of these comparisons are then used in selecting a series of video frame types (STEP 116), which are used to encode the video frames (STEP 120).

Figure 2:
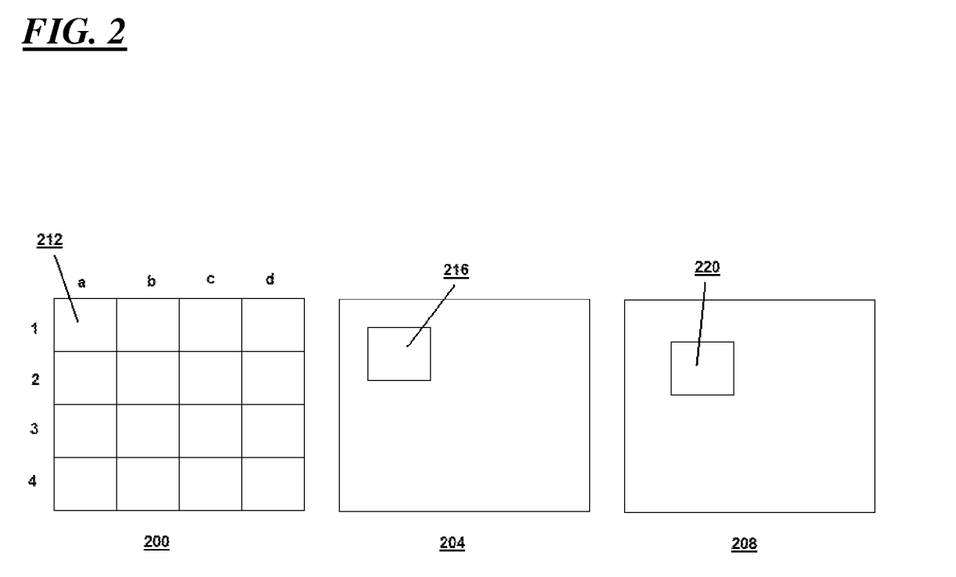
FIG. 2 depicts superblocks of downscaled video frames in accordance with various embodiments of the invention.

Referring to FIG. 2, a series of downscaled video frames 200, 204, 208 are shown. The original, full-size video frames may be, for example, uncompressed television signals, stored in a digital format. In the example of FIG. 2 above, the frame may be downscaled by a factor of, for example, eight, whereas in other implementations the frames may be downscaled by a different factor (e.g., using a factor greater or less than eight). Given an original image size of, for example, 720×480 pixels, and using a downscaling factor of, for example, eight, each downscaled frame would then be 90×60 pixels in size. This downscaled image may then be divided into rows and columns of superblocks; for example, 10 rows and 6 columns of superblocks, resulting in each superblock being 9×6 pixels in size. In certain embodiments, the luminance component spatial resolution of each frame is downscaled along both the horizontal and vertical axes. A superblock 212 in downscaled frame 200 may be compared with, for example, areas 216 and 220 of previous frames 204 and 208 using an LRME process. The coordinates of the areas 216 and 220 may or may not correspond to the same coordinates of superblock 212.

For each superblock, a motion estimation (ME) process may be used to compare the current frame and a number of previous frames up to the last reference frame (i.e., I- or P-frame). In one embodiment, the current frame is compared with up to three previous frames. The comparison may be performed in the order the frames are displayed. In one embodiment, the ME process is performed on the downscaled frames, and therefore referred to as Low Resolution Motion Estimation (LRME). The LRME process may be done, for example, using a "full search" in a small search area wherein the search area may be +/−4 reduced pixels along the x-axis and +/−3 reduced pixels along the y-axis. Using a downscaling factor of eight, for example, this search area corresponds to +/−32 pixels along the x-axis and +/−24 pixels along the y-axis of the original frame. The results of the comparison between the current frame and the previous frames can then be evaluated. For example, a superblock 212 in frame 200 can be compared to regions in frames 204 and 208, and the result used to select the video frame types that are to be used to encode the video frames.

Figure 3:
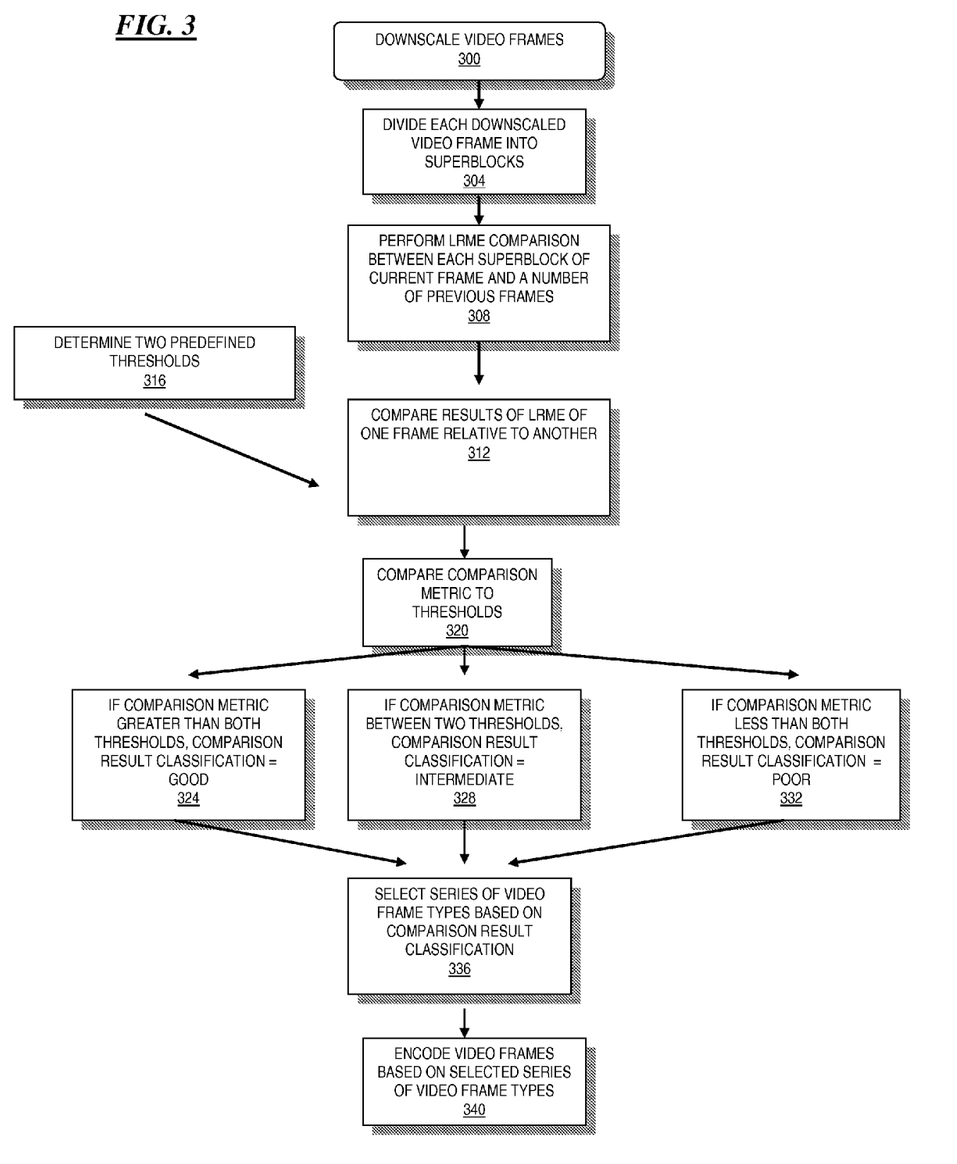
FIG. 3 is a more detailed flow chart depicting steps for encoding a plurality of video frames in accordance with various embodiments of the invention.

FIG. 3 depicts, at a more detailed level, steps for encoding video frames in accordance with various embodiments of the invention. As in FIG. 1, the steps include downscaling the video frames (STEP 300), dividing each downscaled video frame into superblocks (STEP 304) and, for each superblock, using an LRME process to compare the current frame to previous frame(s) (STEP 308). The LRME results of one frame relative to another are assessed (STEP 312). An example of a comparison metric is the number of superblocks in a frame having a SAD less than a predefined value. If the SAD of a predetermined number of superblocks in a frame, for example, 6 out of 10 total superblocks, is less than this predefined value, then the frame is classified as good relative to a preceding frame. Another example of a comparison metric is the average of the sum of the absolute differences (SAD) of LRME values of all superblocks in a frame relative to one of the previous frames, where the LRME value of a superblock is the SAD between that superblock and corresponding pixels of one of the previous frames. A number of predefined thresholds, for example, two, which may be determined previously to the use of the LRME process, can be used (STEP 316) to create, for example, three classifications—one above the higher threshold, one below the lower threshold, and one between the two. The predefined thresholds may be determined, for example, by comparing a display of the video frames to a display of a series of standard video frames of known quality.

Still referring to FIG. 3, the comparison metric is then compared to the thresholds (STEP 320), resulting in a classification of the video frames into one of the comparison result classifications (e.g., good, intermediate or poor if two thresholds are used). In other embodiments, a different number of thresholds may be used, the number of thresholds being one or more, thereby defining two or more ranges for selection of the type of frames to be used. The following pseudo code describes the classification process using two thresholds:

```
If LRME value < Threshold1
    criteria = good
else
    If LRME value < Threshold2
        criteria = intermediate
    else
        criteria = poor
```

In the example above, the value of Threshold1 is less than or equal to the value of Threshold2. The values of these thresholds, as noted, may be the result of one or more objective and/or subjective tests where the aim is to determine the differences between values for "good", "intermediate" and "poor". Subjective tests usually comprise a series of standard video clips, the known quality of which is compared against the output of a display system using the techniques described herein and often based on the subjective judgments of professional viewers. Objective tests typically compare a video segment to objective target values. Objective tests may include, for example, the use of a just noticeable differences metrix (JND metrix). By making small changes to the threshold values, the JND metrix is checked, and the threshold values providing the best results are used. The test itself may comprise a sequence of frames that are defined as "poor," for example a P-frame only sequence, a sequence of frames defined as an "intermediate level", such as a sequence comprising only one B-frame between P-frames, and a sequence of frames defined as "good", in which there are at least two B-frames between P-frames.

Returning to FIG. 3, a metric may be used to compare the LRME results against a number of thresholds, for example, two thresholds. In one embodiment, the metric is the average of SADs of all superblocks in a frame. In this embodiment, a metric value less than both thresholds results in a classification of "good"; a value in-between the thresholds results in a classification of "intermediate"; and a value greater than both thresholds results in a classification of "poor." In another embodiment, the metric is the number of superblocks with SADs less than a predefined amount. In this embodiment, a metric value greater than both thresholds results in a classification of "good" (STEP 324). If the comparison metric is less than both thresholds, the comparison result classification will be "poor" (STEP 328). If the comparison metric is in-between both thresholds, the comparison result classification will be "intermediate" (STEP 332). A series of video frame types is then selected based on the comparison result classification (STEP 336) and the video frames are encoded based on the selected series of video frame types (STEP 340).

The following provides an example in which four video frames (Frame 1, Frame 2, Frame 3, and Frame 4) are used as the video source. It is assumed that Frame 1 is a reference frame (i.e., an I- or P-frame) and the types of the other frames in the video sequence are to be encoded as a series of frames. For example, a comparison of Frame 2 relative to Frame 1 resulting in a poor classification (e.g., the comparison metric is greater than both thresholds) may signify a change such as a scene cut between the frames, and therefore Frame 2 is encoded using another reference frame, and Frames 3 and 4 will encoded in the next iteration. If, however, the results of comparing Frame 2 relative to Frame 1 are good, the results of comparing Frame 3 to Frame 1 are intermediate or good, and the results of comparing Frame 4 to Frame 1 are poor, Frame 2 is encoded as a B-frame and Frame 3 as a P-frame. In this case, the type of frame 4 will be determined in the next iteration. As a final example, if the comparisons of Frame 2 relative to Frame 1 and Frame 3 relative to Frame 1 are good and the comparison of Frame 4 relative to Frame 1 is intermediate or good, then Frame 2 and Frame 3 are encoded as B-frames and Frame 4 as a P-frame. The method continues until the last frame type is identified, which then becomes the first frame for the next subsequence identification (i.e., Frame 4 in this example becomes Frame 1 in the next video frame sequence).

The above-described technique can be generalized to apply to any video frame i in a subsequence comprising N frames, where N is greater than 1, and $1 \leq i \leq N$. Specifically, a first frame may be classified as a reference frame and comparisons may be performed between it and each of the second through i frames. If the comparisons between the first frame and the second through i−1 frames each result in a classification of good, but the comparison between the first frame and frame i does not, then the second through i−2 frames can be encoded as bi-directional frames, and frame i can be encoded as a reference frame.

Figure 4:
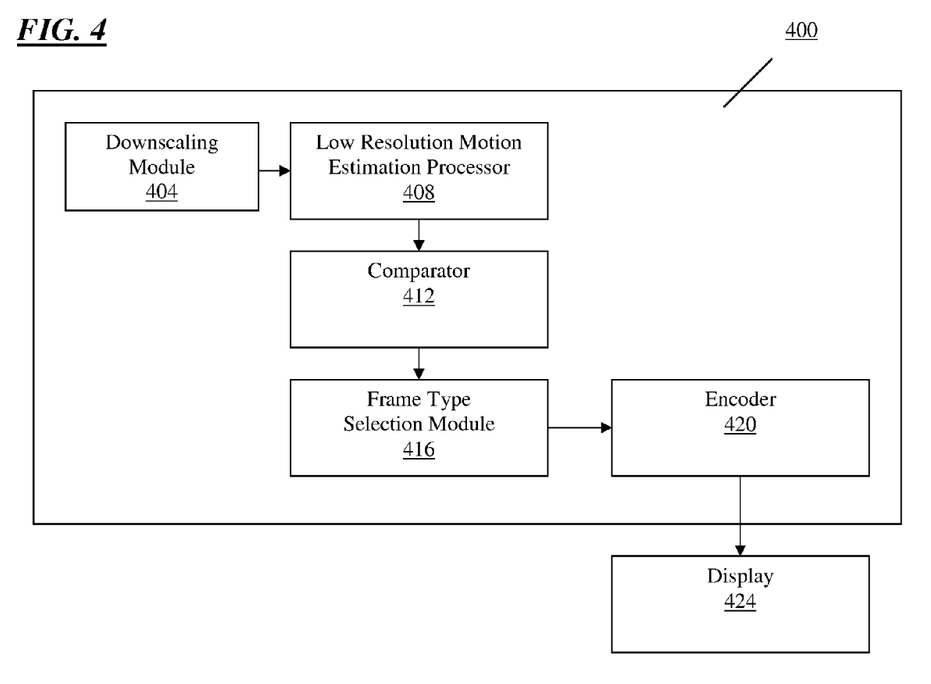
FIG. 4 depicts a device for encoding a plurality of video frames in accordance with various embodiments of the invention.

FIG. 4 illustrates schematically a device 400 for encoding video frames in accordance with the techniques described above. The device includes a module 404 for downscaling the video frames and dividing each of the downscaled video frames into superblocks. Also shown is a processor 408 for performing LRME on each of the superblocks for each frame and a comparator 412 for comparing the results of the LRME for all superblocks of a frame, according to the chosen comparison metric, to corresponding thresholds. The device also includes a selector 416 for selecting a series of video frame types based on the series of comparison metrics and an encoder 420 for encoding the video frames in response to the selected series of video frame types. Also shown is a display output 424 to which the device may transmit the resulting encoded video frames.

In some embodiments, the device 400 may implement the functionality of the present invention in hardware or software, or a combination of both on a general-purpose computer. In addition, such a program may set aside portions of a computer's random access memory to provide control logic that affects one or more of the image manipulation, segmentation, and display. In such an embodiment, the program may be written in any one of a number of high-level languages, such as FORTRAN, PASCAL, C, C++, C#, Java, Tcl, or BASIC. Further, the program can be written in a script, macro, or functionality embedded in commercially available software, such as EXCEL or VISUAL BASIC. Additionally, the software can be implemented in an assembly language directed to a microprocessor resident on a computer. For example, the software can be implemented in Intel 80×86 assembly language if it is configured to run on an IBM PC or PC clone. The software may be embedded on an article of manufacture including, but not limited to, "computer-readable program means" such as a floppy disk, a hard disk, an optical disk, a magnetic tape, a PROM, an EPROM, or CD-ROM.

The invention may be embodied in other specific forms without departing form the spirit or essential characteristics thereof. The foregoing embodiments, therefore, are to be considered in all respects illustrative rather than limiting the invention described herein. The scope of the invention is thus indicated by the appended claims, rather than by the foregoing description, and all changes that come within the meaning and range of equivalency of the claims are intended to be embraced therein.

What is claimed is:

1. A method of encoding a plurality of video frames, the method comprising:
   downscaling the plurality of video frames;
   dividing each of the downscaled video frames into a plurality of superblocks;
   performing a low resolution motion estimation on each of the superblocks for each downscaled video frame with superblocks from at least one previous downscaled video frame;
   comparing results from the low resolution motion estimation for each superblock to a corresponding superblock in the at least one previous downscaled video frame, resulting in a series of comparison metrics for the plurality of video frames;
   selecting a series of encoded video frame types from a plurality of different series of encoded video frame types each having a different sequence of encoded video frames types within the series and selected from I, P, and B frame types based at least in part on the series of comparison metrics; and
   encoding the plurality of video frames using the selected series of encoded video frame types, thereby resulting in an accurate representation of the plurality of video frames.

2. The method of claim 1 further comprising encoding the plurality of video frames using MPEG2 video encoding.

3. The method of claim 1 wherein the comparison metrics comprise an average of the sum of the absolute differences between motion vectors of the plurality of superblocks in a first frame and a preceding frame of the plurality of video frames.

4. The method of claim 1 wherein the comparison metrics comprise the number of superblocks for which the difference between motion vectors in a first frame and a preceding frame of the plurality of video frames is above a predetermined threshold.

5. The method of claim 1 wherein the selection of the series of encoded video frames is based at least in part on a comparison between the series of comparison metrics from one of the video frames to a previous video frame and one or more predefined thresholds.

6. The method of claim 5 further comprising determining the one or more predefined thresholds by comparing a display of the video frames to a display of a series of standard video frames of known quality.

7. The method of claim 5 wherein the one or more predefined thresholds comprises two predefined thresholds such that the comparison between the series of comparison metrics and the two predefined thresholds results in a classification of the video frames into one of three comparison result classifications.

8. The method of claim 7 wherein the three comparison result classifications comprise a good comparison classification for which the comparison metric is greater than each of the two predefined thresholds, an intermediate comparison classification for which the comparison metric is between the two predefined thresholds, and a poor classification for which the comparison metric is less than each of the two predefined thresholds.

9. The method of claim 8 wherein the encoded video frame types comprise reference frames and bi-directional frames.

10. The method of claim 9 wherein the reference frames comprise intra frames and predicted frames.

11. The method of claim 9 wherein the plurality of video frames comprises N frames, where N is a positive integer greater than 1, wherein a first frame is classified as a reference frame, wherein the comparison between each of the second through $(N-1)^{st}$ frames and the first frame results in a classification of good and the comparison between the $N^{th}$ frame and the first frame does not result in a classification of good, and wherein encoding the plurality of video frames further comprises encoding each of the second through $(N-1)^{st}$ frames as bi-directional frames and encoding the $N^{th}$ frame as a reference frame.

12. The method of claim 11 wherein N=4.

13. A device for encoding a plurality of video frames, the device comprising:
   a downscaling module for downscaling the plurality of video frames and dividing each of the downscaled video frames into a plurality of superblocks;
   a processor coupled to the downscaling module for performing a low resolution motion estimation on each of the superblocks for each downscaled frame with superblocks from at least one previous downscaled video frame thereby producing low resolution motion estimation metrics for each superblock;
   a comparator coupled to the processor and for comparing the results of the low resolution motion estimation metrics for each superblock to low resolution motion estimation metrics from a corresponding superblock in the at least one previous downscaled video frame, resulting in a series of comparison metrics for the plurality of video frames;
   a selector coupled to the comparator and for selecting a series of encoded video frame types from a plurality of different series of encoded video frame types each having a different sequence of encoded video frame types within the series and selected from I, P, and B frame types based at least in part on the series of comparison metrics; and
   an encoder for receiving from the comparator the selected series of encoded video frame types and encoding the plurality of video frames using the series of encoded video frame types, thereby producing an accurate representation of the plurality of video frames.

14. The device of claim 13 wherein the selector selects a series of encoded video frame types based at least in part on a comparison between the series of comparison metrics from one of the video frames to a previous video frame and one or more predefined thresholds.

15. The device of claim 14 wherein the one or more predefined thresholds comprises two predefined thresholds such that the comparison between the series of comparison metrics and the two predefined thresholds results in a classification of the video frames into one of three comparison result classifications.

16. The device of claim 15 wherein the three comparison result classifications comprise a good comparison classification for which the comparison metric is greater than each of the two predefined thresholds, an intermediate comparison classification for which the comparison metric is between the two predefined thresholds, and a poor classification for which the comparison metric is less than each of the two predefined thresholds.

17. The device of claim 16 wherein the video frame types comprise reference frames and bi-directional frames.

18. The device in claim 17 wherein the reference frames comprise intra frames and predicted frames.

19. The device in claim 17 wherein the plurality of video frames comprises N frames, where N is a positive integer greater than 1, wherein a first frame is classified as a reference frame, wherein the comparison between each of the second through $(N-1)^{st}$ frames and the first frame results in a classification of good and the comparison between the $N^{th}$ frame and the first frame does not result in a classification of good, and wherein the encoder is configured for encoding each of the second through $(N-1)^{st}$ frames as bi-directional frames and encoding the $N^{th}$ frame as a reference frame.

20. The device in claim 19 wherein N=4.

21. An article of manufacture having computer-readable program portions embodied on a non-transitory computer-readable medium for encoding a plurality of video frames, the article comprising computer-readable instructions for:
   downscaling the plurality of video frames;
   dividing each of the downscaled video frames into a plurality of superblocks;
   performing a low resolution motion estimation on each of the superblocks for each downscaled video frame with superblocks from at least one previous downscaled video frame;
   comparing the results of the low resolution motion estimation for each superblock to a corresponding superblock in the at least one previous downscaled video frame, resulting in a series of comparison metrics for the plurality of video frames;
   selecting a series of encoded video frame types from a plurality of different series of encoded video frame types each having a different sequence of encoded video frames types within the series and selected from I, P, and B frame types based at least in part on the series of comparison metrics; and
   encoding the plurality of video frames in response to the selected series of encoded video frame types.

22. The method of claim 1:
   wherein the plurality of video frames comprises N frames, where N is a positive integer greater than 1;
   wherein a first frame is a reference frame and the series of comparison metrics for each of the second through $(N-1)^{st}$ frames and the first frame is above one or more predefined thresholds and the series of comparison metrics for the $N^{th}$ frame and the first frame is not above the one or more predefined thresholds; and
   wherein encoding the plurality of video frames further comprises encoding each of the second through $(N-1)^{st}$ frames as bi-directional frames and encoding the $N^{th}$ frame as a reference frame.

23. The device of claim 19:
   wherein the plurality of video frames comprises N frames, where N is a positive integer greater than 1;
   wherein a first frame is a reference frame and the series of comparison metrics for each of the second through $(N-1)^{st}$ frames and the first frame is above one or more predefined thresholds and the series of comparison metrics for the $N^{th}$ frame and the first frame is not above the one or more predefined thresholds; and
   wherein the encoder is configured for encoding each of the second through $(N-1)^{st}$ frames as bi-directional frames and encoding the $N^{th}$ frame as a reference frame.

* * * * *

UNITED STATES PATENT AND TRADEMARK OFFICE
CERTIFICATE OF CORRECTION

PATENT NO. : 8,611,423 B2
APPLICATION NO. : 12/029201
DATED : December 17, 2013
INVENTOR(S) : Romm Page 1 of 1

It is certified that error appears in the above-identified patent and that said Letters Patent is hereby corrected as shown below:

In the Specification

Column 3, Line 8, delete "$1 \leq i \leq N$," and insert -- $1 < i < N$, --, therefor.

Column 6, Line 63, delete "form" and insert -- from --, therefor.

Signed and Sealed this
Twentieth Day of May, 2014

Michelle K. Lee
*Deputy Director of the United States Patent and Trademark Office*